April 5, 1938.  E. G. BRISSE  2,113,168
LOAD HOLDING WEIGHING SCALE
Filed Feb. 1, 1936
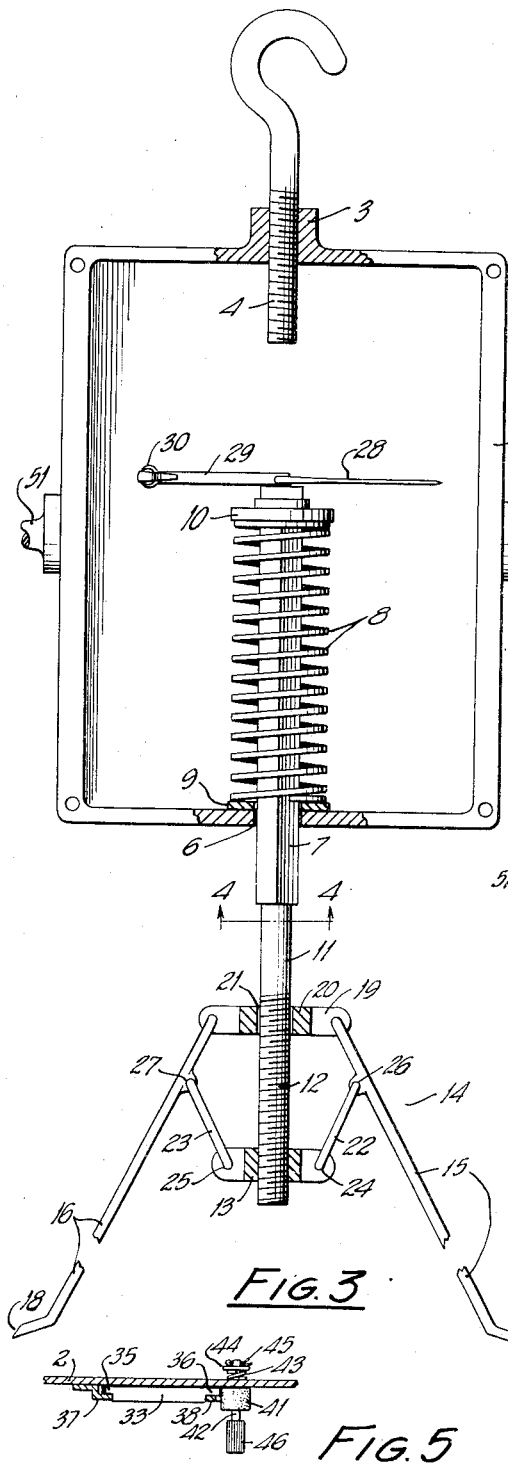
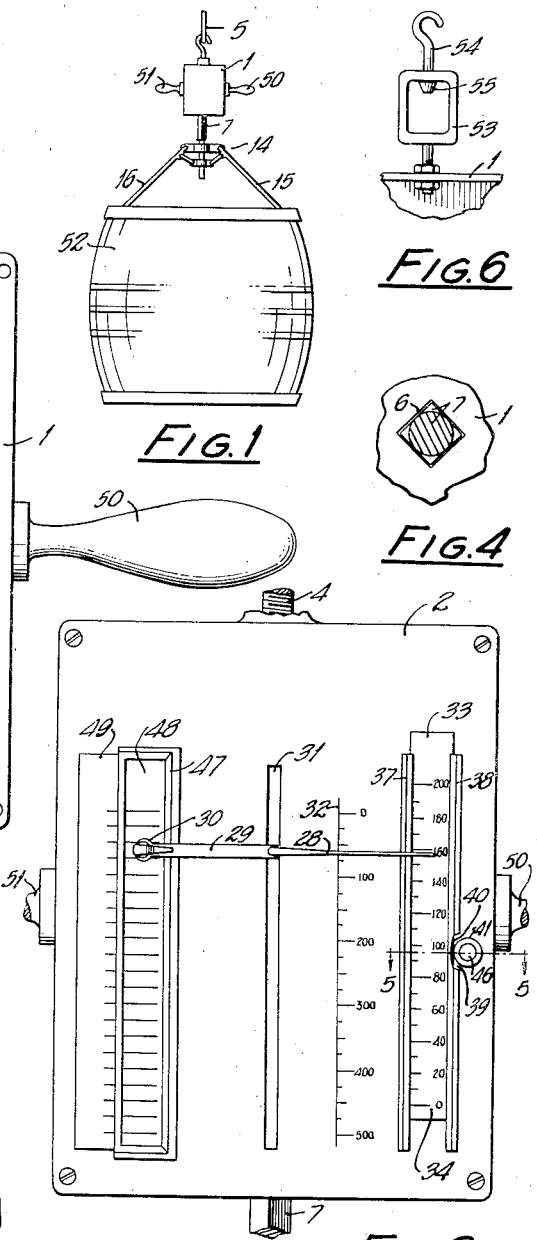
INVENTOR
EMILE G. BRISSE
By
ATTORNEY Patented Apr. 5, 1938

2,113,168

UNITED STATES PATENT OFFICE 2,113,168

LOAD HOLDING WEIGHING SCALE

Emile G. Brisse, Troy, N. Y.

Application February 1, 1936, Serial No. 61,943

5 Claims. (Cl. 265—63)

My invention relates to devices for measuring, by weight, the quantities of liquid dispensed or withdrawn from a container. While not limited thereto, it is particularly adapted for measuring the quantity of beer withdrawn from a barrel.

In hotels and other places where beer is sold over the bar, it is extremely desirable, in order to prevent unaccountable losses, to measure the quantity of the beer withdrawn during any period from the barrel on tap. It is also advantageous to know at any time the quantity remaining in the barrel. Metering devices at the top or in the pipe line, and which operate on the principle of ordinary flow meters, have been suggested, but due to variations in pressure on the line, foam, gas, etc. such devices are not at all reliable.

One of the objects of my invention is to provide a cheap and extremely simple device which will indicate the weight and hence quantity of beer which has been withdrawn from a barrel up to any given time. Another object is to provide a simple weighing device of this character combined with a simple and efficient means by which a barrel or half-barrel of beer may be easily lifted from the floor and suspended from a spring balance which will indicate the current weight of the barrel and its contents. Another object is to provide in a device of this character a spring balance having an adjustable scale whereby variations in the weight of different barrels, rather than their contents, may be compensated for. A further object is to provide a device of this character which will automatically record the quantity of beer withdrawn from the barrel during the time any particular bartender or shift is on duty so that the quantity sold or otherwise disposed of may be accurately ascertained.

With these objects in view, my invention includes the novel elements and the combinations and arrangements thereof described below and illustrated in the accompanying drawing in which—

Fig. 1 is a small scale elevation view showing a beer barrel suspended by my measuring device;

Fig. 2 is a fragmentary front elevation of my device showing the indicating pointers and the various scales thereon;

Fig. 3 is a fragmentary elevation view, partially in section, and with the cover plate removed to show the interior construction of my device;

Fig. 4 is a section in the plane 4—4 of Fig. 3;

Fig. 5 is a fragmentary section in the plane 5—5 of Fig. 2; and

Fig. 6 is a fragmentary elevation view of a modified form of turnbuckle which may be used with my device.

Referring to the drawing, my device in its preferred form comprises a casing 1 provided with a face or cover plate 2 carrying various scales and other features forming parts of my device. At the top, the casing is provided with a threaded boss 3 adapted to receive the threaded stem 4 of a hook or other like device by means of which it is suspended from a suitable overhead support, such as shown at 5. The bottom of the casing is provided with a square opening 6 through which the vertical hanger 7, which is square in section, may slide but in which it cannot turn. Surrounding the upper portion of the hanger 7, and within the casing, is a helical spring 8 which is compressed between a washer 9 resting upon the interior bottom of the casing and a head 10 secured to the upper end of the hanger 7. The size of this spring, of course, depends upon the weight of the barrel which is to be suspended from hanger 7 as hereinafter described.

The lower portion 11 of the hanger 7 is round and threaded, as shown at 12, in a direction opposite to the threads on stem 4. Secured on the threaded portion of the hanger 7 by means of a nut element 13 is a grapple or barrel gripping means represented generally at 14. This grapple comprises two rods 15 and 16 having outwardly turned prongs 17 and 18 at their lower extremities. Their upper extremities pass through and are connected together by a link 19 provided with a collar 20 having an opening 21 therein of sufficient size to permit it to slide freely over the threaded portion of the hanger. The rods 15 and 16 are also connected to the nut element 13 by links 22 and 23 respectively. The lower ends of these links pivotally engage the nut element, as shown at 24 and 25, and their upper ends pivotally engage the elements 15 and 16, as shown at 26 and 27.

Secured to the upper end of the hanger 7 are a pointer 28 and an arm 29 which latter carries a stylus 30 at its extremity. A vertical slot 31 is provided in the cover plate 2 through which rides the means connecting the pointer 28 and the arm 29 with the top of the element 7. Secured to or engraved upon the cover 2 is a scale 32 which may be graduated in pounds similar to the scale on an ordinary spring balance. Beneath the end of the pointer 28 and mounted upon the face of the plate 2 is a sliding scale 33 having a zero index 34 at the bottom. This scale is graduated upwardly in gallons or any other unit in which it is desired to measure the contents of the barrel. The scale 33, at its vertical edges, is provided with projecting lips 35 and 36 adapted to underlie plates 37 and 38 secured to the face plate 2 and which form grooves within which the lips 35 and 36 are vertically slidable. A portion of the plate 38 is cut away, as shown at 39, to expose a vertical edge 40 of the scale 33. If desired, this edge may be milled. Frictionally contacting the edge 40 is a rubber wheel 41 secured to a shaft 42 which is rotatably mounted in the face plate 2. The wheel 41 is held yieldingly against the face plate 2 by means of the small helical spring 43, the washer 44 and a cotter pin 45. At its outer end the shaft 42 carries a knurled head or button 46 by means of which it may be turned. When the button 46 is turned, the rubber disc 41 in contact with the milled edge 40 will raise or lower scale 33. Secured to the face plate 2 is a frame 47 having a vertically extending opening 48 therein through which the stylus 30 extends. The frame 47 is open on the left side to permit a card 49 to be slipped therein beneath the stylus.

From the foregoing it will be apparent that my device comprises a turnbuckle which may be used to lift a barrel of beer from the floor and suspend it upon the spring balance. For example, assuming that the device is suspended at the top from a non-rotating support, as shown in Fig. 1, the casing 1 may be turned by means of the handles 50 and 51 until the nut element 13 is near the extremity of the threaded portion of the hanger 12 and the extremity of the threaded stem 4 is within the threaded boss at the top of the casing. A barrel of beer may then be rolled beneath the device and the points 17 and 18 on the grapples positioned against the inside rim of the barrel at the upper end. By then turning the casing 1 in the opposite direction by means of the handles 50 and 51 the nut element 13 will be raised and force the prongs 17 and 18 in opposite directions into engagement with the rim of the barrel. As the casing 1 is turned, the spring 8 will be gradually compressed until its resistance is equal to the weight of the suspended barrel and its contents whereupon a slight further turning of the casing will raise the barrel 52 from the floor. The actual weight of the barrel and its contents may then be read on scale 32, and the sliding scale 33 may be adjusted by means of the knob 46 until the zero index thereof coincides with the pointer 28. Thereafter, as beer is drawn from the barrel, the compression of spring 8 is gradually relieved so that it expands and the pointer 28 rises. Since scale 33 is graduated upwardly from its zero index in gallons or any other desirable unit the reading of scale 33 will indicate the quantity of beer which has been withdrawn from the barrel. It is obvious, of course, that the scale 33 need not be slidable in which case it is only necessary to note the minimum reading thereon before any of the beer is taken from the barrel and to deduct this minimum reading from any subsequent reading in order to ascertain how much beer has been withdrawn since the barrel was placed on the balance.

The stylus 30 also moves upwardly with the pointer 28 and will record a vertical line on a card 49 inserted beneath the stylus in frame 47.

In practice, each bartender when he goes on duty would be provided with a card 49 which would be inserted in the frame, as shown. Preferably, these cards would be graduated in the same unit as scale 33. In pushing the card into the frame the stylus would mark a horizontal line thereon the location of which would be indicative of the number of gallons of beer then in the barrel. When the bartender goes off duty he would withdraw his card thereby automatically marking thereon another horizontal line. The length of the vertical line drawn by the stylus between the two horizontal lines would indicate the number of gallons withdrawn from the barrel while that particular bartender was on duty.

While I prefer that the suspending hook at the top of the casing 1 be threaded as well as the lower portion of the hanger 7, this is not absolutely necessary as will be apparent from the modified device shown in Fig. 6. Here a swivel construction is substituted for the threaded hook. One member 53 of the swivel is rigidly secured to the top of the casing 1 and a hook 54 having an enlarged bottom 55 extends loosely through the upper portion of the swivel so that everything below the hook may be turned without turning the hook. Thus the barrel will be lifted entirely by the nut element 13 moving upwardly on the hanger 7.

What I claim is:

1. A device for automatically indicating the current quantity of liquid in a container from which said liquid is being drawn from time to time comprising a casing, a spring balance in said casing having an indicating pointer associated therewith, means including a stem threaded into said casing for suspending said balance from a support, whereby a rotation of said casing relative to said stem will raise and lower said balance relative to said support, and means for suspending said container from said balance in position to be weighed thereby including means permitting relative rotation of said balance and said container.

2. A device for automatically indicating the current quantity of liquid in a container from which said liquid is being drawn from time to time comprising a casing, a spring balance in said casing having an indicating pointer associated therewith, threaded means for suspending said casing from a support, and means including a hanger carried by the spring of said balance and oppositely threaded from said first mentioned means, for suspending said container from said balance; said casing being threaded on said first mentioned means whereby rotation of said casing relative to said first mentioned means will raise or lower said balance relative to said support; and said hanger extending through an opening in said casing and cooperating with the casing about said opening to prevent relative rotation of said hanger and casing.

3. A device for automatically indicating the current quantity of liquid in a container from which said liquid is being drawn from time to time comprising a casing, a spring balance in said casing having an indicating pointer associated therewith, means, including a depending stem portion threaded into said casing, for suspending said casing from a support, means, including a threaded nut for engaging said container, and a hanger oppositely threaded from said stem and cooperating with said nut; said hanger being supported by the spring of said balance and extending through said casing and cooperating therewith to prevent relative rotation of said hanger and casing.

4. In a device of the charaacter described, a spring balance including a casing therefor and a depending hanger for suspending articles to be weighed, and an article holding means including a nut; said hanger comprising a threaded stem adapted to engage said nut and extending through and cooperating with said casing to prevent relative rotation of said casing and hanger, and said casing being provided at the top with a threaded opening adapted to engage a stem oppositely threaded from said hanger stem for suspending said device from a support; whereby said casing and said depending hanger may function together as an element of a turnbuckle for raising and lowering, relative to said support, an article to be weighed.

5. A device for automatically indicating the current quantity of liquid in a container from which said liquid is being drawn from time to time comprising a casing, a spring balance in said casing having an indicating pointer associated therewith, means connected to said casing for suspending said balance from an overhead support while permitting said casing to be rotated about said suspending means, a hanger supported by the spring of said balance and comprising a depending stem extending through said casing and cooperating therewith to effect rotation of said stem when said casing is rotated, and means, including a nut element, for engaging said container to lift the same; said stem being threaded and in cooperative relation with said nut element, whereby rotation of said casing will raise and lower said container.

EMILE G. BRISSE.